(12) United States Patent
Rojas et al.

(10) Patent No.: US 8,666,806 B2
(45) Date of Patent: Mar. 4, 2014

(54) SYSTEMS AND METHODS FOR CUSTOMIZING DIRECT MARKETING MAIL PIECES

(75) Inventors: John W. Rojas, Norwalk, CT (US); George M. MacDonald, New Canaan, CT (US)

(73) Assignee: Pitney Bowes Inc., Stamford, CT (US)

( * ) Notice: Subject to any disclaimer, the term of this patent is extended or adjusted under 35 U.S.C. 154(b) by 1246 days.

(21) Appl. No.: 12/195,419

(22) Filed: Aug. 21, 2008

(65) Prior Publication Data

US 2010/0049611 A1 Feb. 25, 2010

(51) Int. Cl.
*G06Q 30/00* (2012.01)
(52) U.S. Cl.
USPC .................................................. 705/14.4
(58) Field of Classification Search
USPC ............................................... 705/14
See application file for complete search history.

(56) References Cited

U.S. PATENT DOCUMENTS

| | | | |
|---|---|---|---|
| 5,060,165 A | 10/1991 | Schumacher et al. | |
| 5,374,044 A | 12/1994 | Belec et al. | |
| 5,819,241 A | 10/1998 | Reiter | |
| 6,141,654 A | 10/2000 | Heiden et al. | |
| 6,154,733 A | 11/2000 | Pierce et al. | |
| 6,173,274 B1 | 1/2001 | Ryan, Jr. | |
| 6,178,411 B1 | 1/2001 | Reiter | |
| 6,408,286 B1 | 6/2002 | Heiden | |
| 6,816,838 B1 | 11/2004 | Ryan, Jr. | |
| 6,970,856 B1 | 11/2005 | Heiden et al. | |
| 7,062,474 B1 | 6/2006 | Reiter | |
| 2003/0004824 A1 | 1/2003 | Joshi et al. | |
| 2004/0267616 A1* | 12/2004 | Kargman | 705/14 |
| 2005/0071289 A1 | 3/2005 | Monsen et al. | |
| 2008/0133345 A1 | 6/2008 | Cordery et al. | |
| 2008/0201185 A1 | 8/2008 | Winkelman et al. | |
| 2009/0019122 A1 | 1/2009 | Abhyanker | |
| 2009/0044246 A1 | 2/2009 | Sheehan et al. | |
| 2009/0070191 A1 | 3/2009 | Gaito | |
| 2009/0213402 A1* | 8/2009 | Marggraff et al. | 358/1.12 |
| 2009/0284530 A1* | 11/2009 | Lester et al. | 345/440 |
| 2012/0054034 A1* | 3/2012 | Mattingly et al. | 705/14.58 |

OTHER PUBLICATIONS

U.S. Appl. No. 12/028,386, filed Feb. 8, 2008, Winkelman et al.

* cited by examiner

*Primary Examiner* — Matthew L Hamilton
(74) *Attorney, Agent, or Firm* — Brian A. Lemm; Charles R. Malandra, Jr.; Steven J. Shapiro

(57) ABSTRACT

Systems and methods for customizing direct marketing mail pieces are described. In one configuration, information relating to an advertiser is customized using demographic, psychographic, addressee, and/or individual profile data. In another configuration, environmental data is utilized to customize direct mail pieces using a two part printing process.

11 Claims, 9 Drawing Sheets

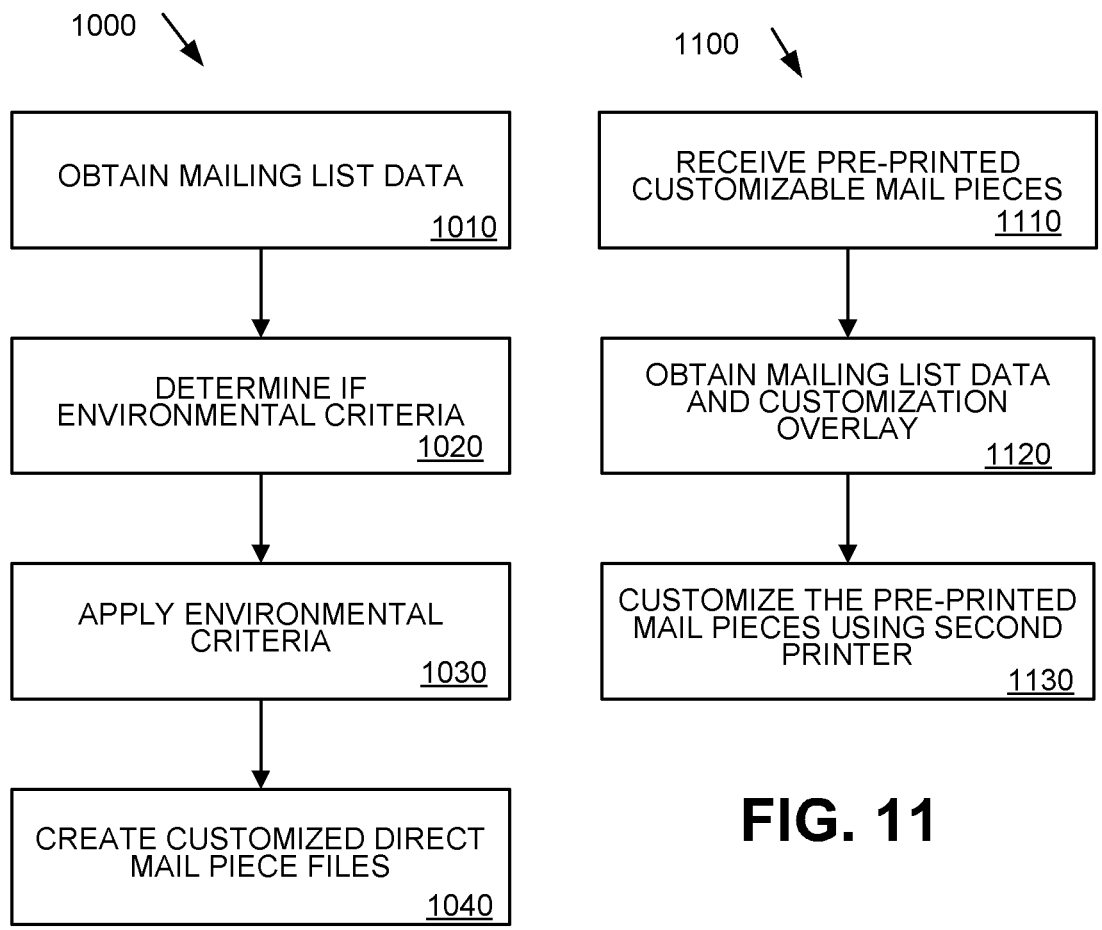

SYSTEMS AND METHODS FOR CUSTOMIZING DIRECT MARKETING MAIL PIECES

FIELD OF THE INVENTION

The present invention relates to direct marketing campaign systems and methods and more particularly to systems and methods for customizing direct marketing mail pieces.

BACKGROUND OF THE INVENTION

Many companies throughout the United States use the delivery services of the United States Postal Service (USPS) to deliver direct mail marketing materials to their customers and potential customers. A company might employ a blanket direct mail campaign if they wish to reach each household in a given area. However, a targeted direct mailing campaign may be more cost effective. Accordingly, many companies utilize information processing systems to determine a targeted mailing list of a subset of households in a given area in order to optimize the cost of the mailing and expected response rate for a direct mail campaign.

Targeting direct mail campaigns may utilize targeted marketing lists developed through U.S. Census Bureau data. In order to protect individual privacy, the census data is typically published as an aggregate or statistical calculation across a group of adjacent households defined as "block groups." Each block group is a bounded area defined by the U.S. census Bureau and may contain several hundred to several thousand residents. Private data system vendors including PITNEY BOWES MAPINFO of Troy, N.Y. provide data manipulation tools using demographic and/or behavioral data referred to as psychographic characteristics at a block group level. For example, an entire block group could be assigned an aggregate demographic or psychographic profile with the understanding that such a profile would not be accurate for each individual in the group.

Individual companies typically maintain individual and/or household level profiles for their own customers and may use marketing data system tools with their own individual profile customer data to enhance targeting effectiveness. A common company level data set is the corresponding current customer mailing list. Such companies typically operate in accordance with published data privacy guidelines and are also subject to privacy laws restricting use of customer data in various jurisdictions. However, such companies may use block group level demographic/psychographic data in addition to individual profile/history data when creating a targeted marketing campaign. In certain circumstances such companies may use individual profile data to provide direct marketing services to third parties such as when co-marketing to its customers in appropriate circumstances.

Direct mail effectiveness depends on several factors including targeting the appropriate potential customers, providing an offer of sufficient value and using attractive design and content in the direct mail piece. Direct mail creation information processing systems now also provide at least a limited ability for providing personalized direct mail pieces using variable data printing. For example, the name of the targeted potential customer may be used in the advertising section of the direct mail piece to create a direct mail piece tailored for the individual potential customer. Because it is important that a potential customer know where the advertiser is located, direct mail pieces associated with a retail establishment often include the physical address, internet address and telephone contact information associated with the advertiser. Moreover, the direct mail piece may include a small static map for directing the potential customer to the advertiser retail location.

However, the information conveyed regarding the advertiser location is not dynamically tailored to the prospective customer. Because the space available for such maps on the direct mail piece is limited, such direct mail piece maps include very limited reference landmark information. Similarly, variable data printing systems used in creating direct mail pieces may not be configured to print variable data on any portion of the mail piece, but rather variable printing may be restricted to a subset of the direct mail piece. Additionally, direct mail pieces may be created using a first print process and then later addressed using a dedicated address printer. Such dedicated address printers may be configured to print only a subset of the area of the direct mail piece. Moreover, traditional direct mail piece creation systems do not make use of environmental data.

Accordingly, there are several disadvantages of currently available systems and methods for customizing direct mail pieces.

SUMMARY

The illustrative embodiments of the present application describe direct marketing campaign methods and systems and more particularly describe systems and methods for customizing direct marketing mail pieces.

In one illustrative configuration, systems and methods for tailoring information relating to an advertiser on a direct mail piece targeting individual potential customers are described. In the illustrative configuration, the information relating to the advertiser may include customized advertiser location related information such as nearby landmarks selected based upon the targeted customer's individual data, demographic, psychographic and/or location intelligence related data.

In another illustrative configuration, systems and methods for tailoring advertiser location related information for advertisers with multiple locations in an area are described. In the illustrative configuration, the information is customized by using the targeted customer's individual data, demographic, psychographic and/or location intelligence related data including data relating to nearby businesses. Where the advertisements are targeted to one of a plurality of advertiser locations, a count of total targeted mailings per location may be provided for use in billing individual franchises.

In yet another illustrative embodiment, systems and methods directed to tailoring advertiser location related information utilizing at least two print processes are described. In the illustrative configuration, a first print process is utilized to create a direct mail piece having a customizable portion and then a second print process using dedicated address printers at another facility is utilized to print on overlay on the customizable portion of the direct mail piece.

In yet another illustrative embodiment, systems and methods directed to tailoring mail pieces utilizing physical environment information are described. In the illustrative configuration, physical environment information such as a destination area weather forecast is utilized to determine an appropriate direct mail piece customization. The weather forecast based customization may be further tailored using block group level demographic and psychographic data, addressee data and/or individual/household level profile/history data. If a separate primary mail piece print process is utilized, the customization overlay may be applied during a second print process.

Several additional alternative configurations are also described below.

BRIEF DESCRIPTION OF THE DRAWINGS

The accompanying drawings illustrate several embodiments of the application, and together with the general description given above and the detailed description given below, serve to explain certain principles of the invention. As shown throughout the drawings, like reference numerals designate like or corresponding parts.

FIG. 10 is a flowchart showing an illustrative process for customizing a direct mail piece using environmental data according to an illustrative embodiment of the present application.

FIG. 11 is a flowchart showing an illustrative process for customizing a direct mail piece using a first print process and a second print process according to an illustrative embodiment of the present application.

DETAILED DESCRIPTION

The illustrative embodiments of the present application describe direct marketing campaign systems and methods and in certain embodiments describe systems and methods for customizing direct marketing mail pieces. The illustrative embodiments of the present application are provided to describe illustrative systems and methods that address needs in the marketplace including but not limited to systems and methods directed to customizing information related to an advertiser on a direct mail piece, systems and methods directed to customizing direct mail advertisements for advertisers with multiple locations, systems and methods directed to customizing direct mail advertisements using environmental data and systems and methods for customizing direct mail pieces utilizing a first print process to create a direct mail piece and then a second print process at another facility to customize the direct mail piece. The illustrative embodiments are described with reference to direct mail pieces comprising postcards, but other direct mail pieces including letters, catalogs, and brochures may be utilized. Similarly, the physical delivery systems described in the embodiments herein comprise the United States Postal service (USPS) delivery system, but other physical delivery systems may be utilized in conjunction with or as an alternative to the USPS.

Figure 1:
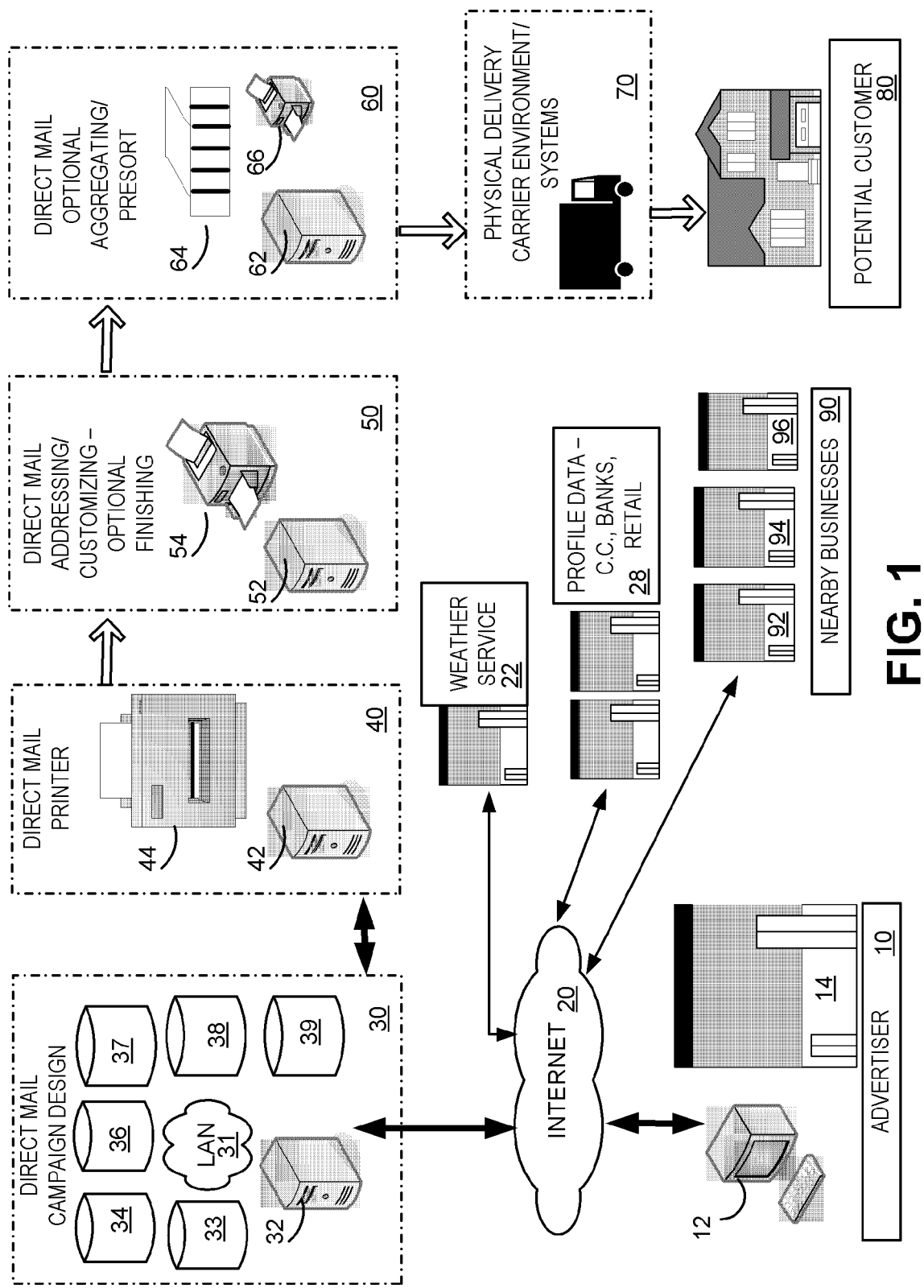
FIG. 1 is a schematic diagram of a customized direct mail creation and distribution system according to an embodiment of the present application.

Referring to FIG. 1, a schematic diagram of a customized direct mail creation and distribution system according to an embodiment of the present application is shown. An advertiser 10 comprises a small local business such as a retailer having a single retail location 14 and a computing system 12 such as a DELL PRECISION M6300 connected to the Internet 20. In alternative embodiments, the advertiser includes a national or regional business having many locations and computing systems and also a national or regional franchise having many locations. A direct mail piece campaign design system 30 is connected to the Internet 20. As will be appreciated with reference to the description herein, a large advertiser may comprise any or all of systems 30, 40, 50 and 60 in a captive in-house operation. Similarly, a single advertising firm may also comprise any or all of systems 30, 40, 50 and 60 as an integrated service provider.

The direct mail piece campaign design service includes system 30 having a local area network 31 connected to the Internet 20. Server 32 provides a campaign design service accessible using the Internet 20 and a browser interface. Alternatively, the campaign design service processes described herein may be provided using a heavy client interface. A first database available on LAN 31 is a campaign data and billing database 33 that stores information related to the individual campaigns and any effectiveness tracking. A second database available on LAN 31 is a block group level demographic and psychographic database 34 having data available from the U.S. Census Bureau and private data sources such as those used with systems provided by PITEY BOWES MAPINFO including MAPINFO PROFESSIONAL. A third database available on LAN 31 is a location intelligence database 36. The location intelligence database 36 includes map data and automobile traffic data. The location database also includes a map of businesses with location and associated categories such as by NAICS code.

A fourth database available on LAN 31 is an individual profile database 37. The individual profile database 37 includes a first level of basic addressee profile information. The first level includes a list of known male and known female given names. For example, an addressee having the given name "John" may be assumed to be male. Similarly, the given name "Jane" may be assumed to be female, both to 95% certainty. Alex might be male to 75% certainty and Kris is female to only 10% certainty. Additional assumed addressee category data may be stored and may be varied by location or application. The next level of individual profile data includes a current customer list with addresses and optionally profile data for each registered advertiser 10. The database 37 is secured such that only advertiser 10 has the ability to utilize the corresponding current customer profile data. The individual profile data in database 37 may also include individual data from nearby businesses 92, 94, 96 if privacy regulations permit. For example, as described below, if a potential customer 80 is a customer of a nearby business 90, that nearby business may be utilized as a landmark on a direct mail piece map. Database 37 may also include individual data received from large businesses 28 such as credit card companies, banks and retail businesses if and to the extent privacy regulations permit such use. Furthermore, database 37 optionally includes a privacy regulation table including geographically organized privacy rules and business category privacy restrictions such as privacy restrictions placed on the mortgage industry.

A fifth database available on LAN 31 is an advertising design database 38 that includes templates and individual designs used in a particular direct mail campaign. Each advertiser is provided access to its individual templates and designs. For example, if the direct mail piece is a postcard, the design may include a static front advertising portion that is pre-printed and a dynamic back including certain static portions and an addressee portion along with a customizable portion. Alternatively, the front of the postcard may also be dynamically printed and customized using the processes described herein. The advertising design database may also be used to configure a second print process region such that the customized portion overlay may be synchronized with the customized portion output of the first print process. The sixth database is the customization database 39 and includes the customization data and tables used to apply the customization algorithms as described herein. Illustrative data included in the tables is described herein with reference to the illustrative embodiments using the data.

An environmental data resource 22 is also available to server 32 using a communications channel such as the Internet 20. For example, the U.S. National Digital Forecast Database (NDFD) is made available to the public and commercial enterprises by the U.S. National Weather Service's (NWS) digital forecast database. This service provides a web service using a Simple Object Access Protocol (SOAP) server and extensible markup language (XML) formatted data.

In one alternative configuration, the mail piece design is not controlled by system 30, but rather direct mail pieces are provided and system 30 utilizes addressing/customizing system 50 to provide for mail piece customization in accordance with the methods described herein. The Server 32 includes a DELL POWEREDGE M1000E server, but other servers such as a SUN T5240 server may be used including geographically dispersed servers. Servers 42, 52 and 62 may also comprise DELL POWEREDGE M1000E servers connected to the Internet 20. The databases are configured using an available relational database such as ORACLE 12i or MICROSOFT SQL server. Moreover, any or all of databases 33, 34, 36, 37, 38 and 39 may be resident in a single server or may be geographically distributed. They may be retrieved in real time or near real time using networking such as web services connected to third party data providers. Many alternative configurations may be used including multiple servers and databases including a geographically distributed system. The processes described herein may be implemented in C++ on a MICROSOFT WINDOWS XP platform and utilize the MICROSOFT SHAREPOINT content management system with "dot net" programs. Alternatively, PHP code may be used with open source systems such as the JOOMLA content management system and APACHE web server with MYSQL databases. The data sources such as weather forecast data may be accessed using their standard web services APIs. Systems 92, 94, 96, 28 and 22 are also accessible using secure connections over the Internet 20 or other suitable communications network.

At least one direct mail printer 40 may be utilized having a computing system 42 and at least one high speed industrial printer 44. The Direct Mail Campaign creation system 30 may be connected to the direct mail printer 40 using a secure public network such as a Virtual Private Network (VPN) connection over the Internet 20 or may be connected using a dedicated connection. The direct mail pieces may be printed in template form using printer 44 or may alternatively be printed individually such that the customization is provide per direct mail piece using printer 44. Furthermore, if a permit postage indicia is utilized, the direct mail pieces do not require additional mail piece finishing for application of a potage meter indicium or stamp application. If an aggregated direct mail printing is desired, the embodiment may further include the systems and methods of commonly owned, co-pending U.S. patent application Ser. No. 09/898,232, filed Jul. 2, 2001 by Joshi, et al., the application hereby incorporated by reference in its entirety.

If a separate direct mail addressing/customizing/finishing system 50 is utilized, the direct mail pieces are physically delivered in bulk from the direct mail printer 40 to system 50. Computing system 52 may also be connected through the Internet 20 such as using a VPN for connection to direct mail campaign design system 30. A second printing process using printer 54 includes a dedicated address printer that is also utilized to print a customized portion of the direct mail piece. Alternatively, printer 54 is not a dedicated address printer. If a separate aggregating/pre-sort system 60 is utilized, the direct mail pieces are physically delivered to system 60. The aggregating/pre-sort system 60 includes server 62 and a sorting system 64 such as those utilized in the PITNEY BOWES PSI presort business. Additionally, if just-in-time mail pieces are desired, the systems and methods herein may be used to create customized direct mail pieces using printer 66.

The finished and optionally pre-sorted direct mail pieces are then physically inducted into the USPS systems 70. The direct mail pieces may be inducted at any particular induction point that is convenient to the last processing step or may be inducted at a regional or local postal service location with respect to a group of direct mail pieces. The USPS then delivers the direct mail pieces to the potential customers 80.

Figure 2:
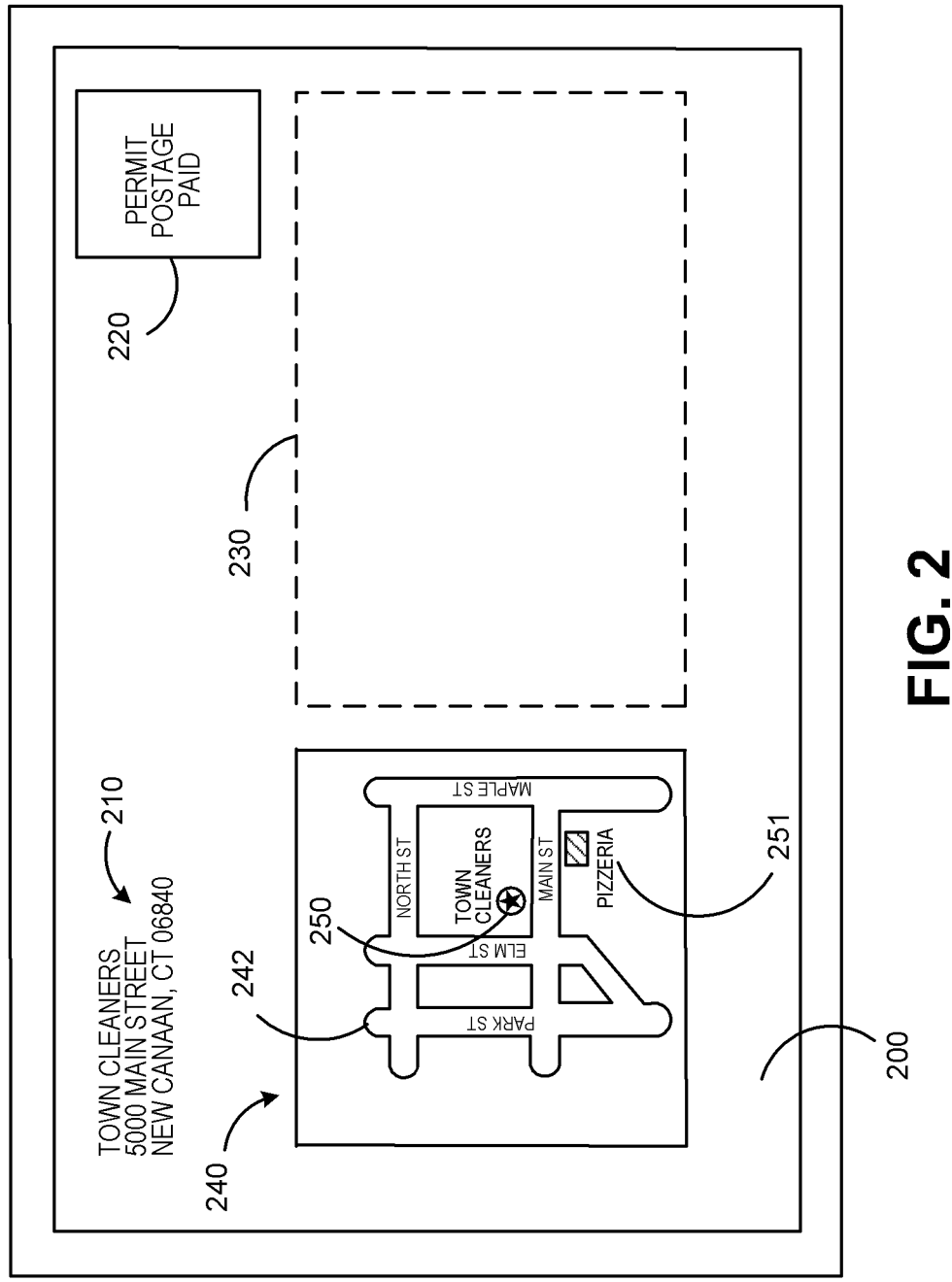
FIG. 2 is a top plan view of a direct mail piece template according to an embodiment of the present application.

Referring to FIG. 2, a top plan view of a direct mail piece template 200 according to an embodiment of the present application is shown. An illustrative direct mail piece includes an advertising postcard 200. The template includes preprinted sections including the return address field 210, the postal indicium 220 that is a permit postage block. An empty address block 230 is provided and a customizable section 240 is preprinted. In this example, the customizable section involves information regarding the advertiser—the advertiser location and nearby landmarks. Because space is limited on an information map provided on a direct mail piece, one might be led to use a single static landmark reference. However, it is unlikely that each potential customer in a targeted direct marketing mailing campaign will be familiar with any one selected landmark. Accordingly, a dynamic landmark customized to the intended recipient may increase the response rate to the associated direct mailing campaign. Other dynamic advertiser related information may be used such as including dynamic sales and service offerings listed to highlight a more relevant subset of sales and services offered. Moreover, dynamic customized information related to the advertiser that is not location related may be used in each of the embodiments described herein, such as highlighting various social program initiatives. For example, one group of recipients (e.g., male) may receive a customized mail piece noting an advertiser's sponsorship of a little league baseball team, while another recipient (e.g., female) receives a notice of the advertiser's sponsorship of a GIRL SCOUT troop.

Accordingly, in several illustrative embodiments described herein, the customizable portion of the direct mail piece includes a map of the advertiser location vicinity that is customizable for a dynamically applied landmark on the map. The preprinted map 242 includes an indication of the location of the advertiser 250. The customizable database 39 includes a group of nearby businesses 90 or other landmarks that may be dynamically selected using addressee data, block group data or individual data. The potential landmarks are preferably selected and coded when the direct mail template is designed and may be later updated. In the illustrative embodiment, the nearby businesses are respectively a hardware store, a coffee shop and a hairstylist.

The nearby businesses may be categorized by North American Industry Classification System (NAICS) codes or the earlier Standard Industrial Classification (SIC) codes. An illustrative customization system and method uses NAICS codes and a customization table to apply the customization logic. If the customized portion comprises a customized landmark, a default landmark may also be provided if none of the customization criteria are met. For example, the default landmark on map 242 may be a pizzeria at the corner of Main Street and Maple Street. A representative relational database having a table used in determining a customized landmark is provided in Table 1. The Demographic, Psychographic and Addressee test values may be suggested by system 32 when the advertiser sets up the customized direct mail campaign. Here, the system 32 suggests several local landmarks. In the Demographic model, the advertiser may be prompted for a relative importance indication among the suggested landmarks. Accordingly, the high importance coffee shop receives a possible 110% score and the relative low importance hardware store has a maximum score potential of 90%. System 32 maintains a location intelligence database 36 that includes a national or at least regional map database with identifiers for the local businesses including classification data such as NAICS data.

TABLE 1

| Landmark | NAICS | Demographic | Psychographic | Addressee |
|---|---|---|---|---|
| Pizzeria | Default | Default | Default | Default |
| Joe's Hardware | 444130 | 75% Men 25-45 > 20% 15% Income < $100k | Social C2 | M |
| Jack's Coffee | 722213 | 60% Men 45-65 > 20% 50% Income > $80k | Social C1 | East |
| Town Hairstyle | 812112 | 60% Women 18-24 > 20% 40% Income > $50k | Social A | F |
| ... | ... | ... | ... | ... |
| Landmark X | XX | XX | XX | XX |

In an alternative embodiment, sub codes are provided for types of stores having the same NAICS code, such as specifying a numeric sub-code to differentiate pizzerias from other restaurants. Additionally, the sub-code could include a text description of the category such as pizzeria. Example social grade psychographic data include: Social A—higher managerial, administrative or professional; Social C1—supervisory, clerical, junior administrative or professional; and Social C2—skilled manual workers.

Accordingly, the potential landmarks are selected by the advertiser of suggested by system 32 based upon location or other targeting factors. For example, each advertiser is also classified using data such as a NAICS code. The system 32 maintains a lookup table of best fit landmark choices for each advertiser NAICS code based upon the potential landmark NAICS code. The database may be populated using empirical data and may differ by region. Additionally, in an alternative, the default landmark location may be selected using NAICS code mapping described above and then demographic, psychographic and addressee test applied such as in TABLE 1.

Figure 3:
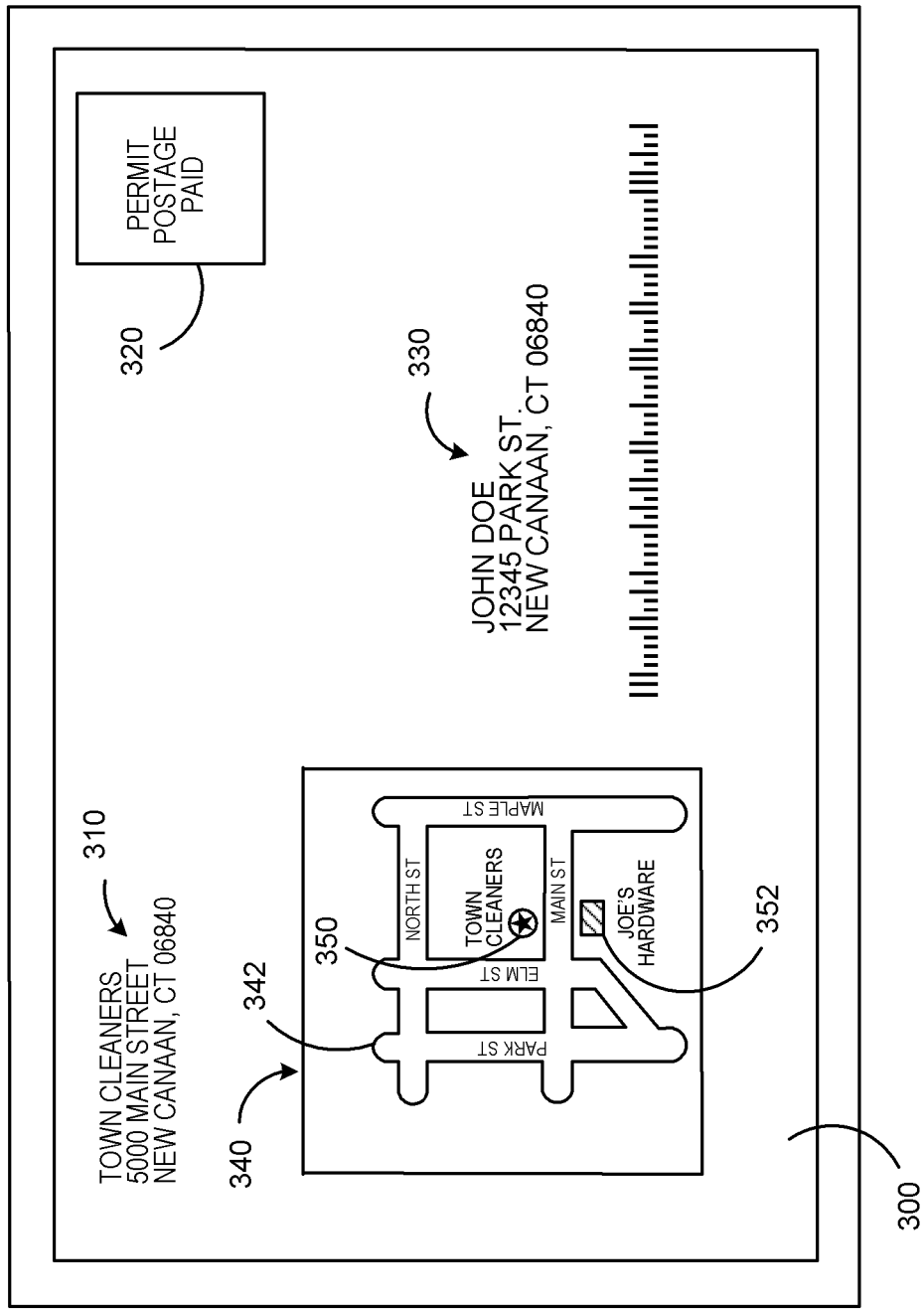
FIG. 3 is a top plan view of a customized direct mail piece using addressee data according to an embodiment of the present application.

Referring to FIG. 3, a top plan view of a customized direct mail piece 300 using addressee data according to an embodiment of the present application is shown. The customized postcard 300 includes preprinted sections including the return address field 310, the postal indicium 320 that is a permit postage block. An address block 330 is provided including a potential customer name. Through a lookup table, the given name John is associated with gender attribute Male. Customizable section 340 is preprinted with map 342 including an indication of the location of the advertiser 350.

The customization applied to a particular direct mail design from design database 38 and particular mailing campaign stored in database 33 may be determined using a table stored in customization database 39 shown in Table 2.

TABLE 2

| Customer | Campaign | Design | Customization | Test | Print |
|---|---|---|---|---|---|
| 000001 | 0000001 | 000001 | Landmark | Addressee | 1 |
| 000001 | 0000002 | 000001 | Landmark | Demographic | 2 |
| 000001 | 0000003 | 000001 | Landmark | Profile | 1 |
| 000001 | 0000004 | 000001 | Landmark | Psychographic | 1 |
| 000001 | 0000005 | 000001 | Landmark | P, D, Ps, A | 1 |
| 000001 | 0000006 | 000002 | Weather | 5 day | 2 |
| ... | ... | ... | ... | ... | |

Here, customer 000001 in campaign 000001 is using design 000001 that is customized using landmark data according to the addressee information. With reference to TABLE 1 above, the mail piece is likely being sent to a Male, so the customized landmark JOE's HARDWARE 352 is selected and printed. The direct mail piece 300 is configured for a single stage printing and thus all printing is performed by a single printer such as printer 44 working is a customized print mode.

As in any customized direct mail piece embodiment described herein, the customization overlay may be sent by the direct mail campaign design system as a trusted third party to the direct mail addressing/customization system 50 without an indication of why the particular overlay was selected. The profile data may be received from a third party such as a bank, a credit card company or a nearby business. Accordingly, any of the profile data used to make the selection is not send to the advertiser or any vendor and remains private.

Figure 4:
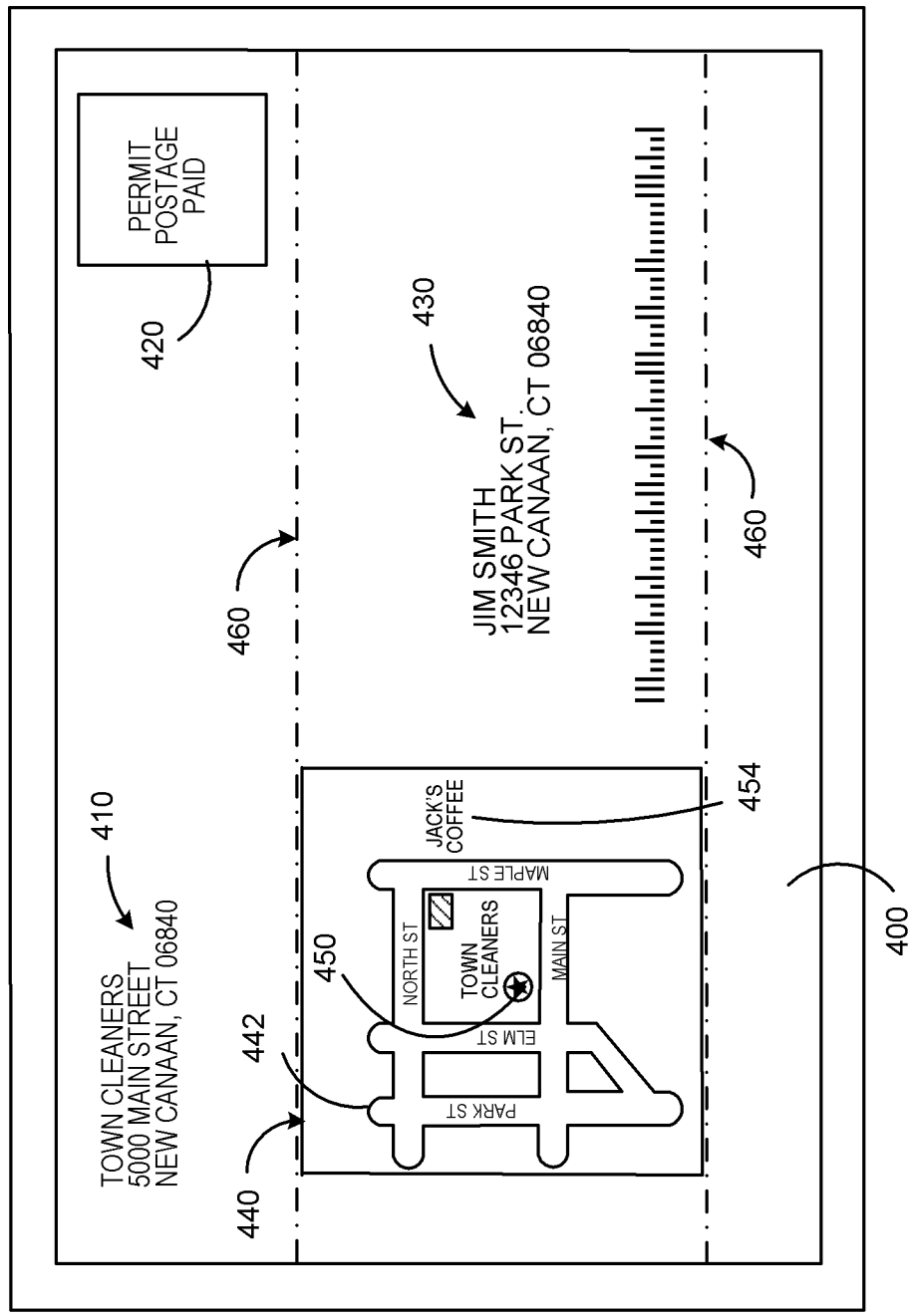
FIG. 4 is a top plan view of a customized direct mail piece using block group demographic data and a secondary print process according to an embodiment of the present application.

Referring to FIG. 4, a top plan view of a customized direct mail piece 400 using block group demographic data and a secondary print process according to an embodiment of the present application is shown. The customized postcard 400 is created using campaign 0000002 of TABLE 2 and includes preprinted sections including the return address field 410, the postal indicium 420 that is a permit postage block. An address block 430 is provided including a potential customer name and the customizable section is map 440. We know from the block group demographic that Jim Smith is likely a 45 year old male with income over $80k, so he scores a 110% to target Jack's Coffee store. Accordingly, the custom landmark used on map 442 to direct the customer to advertiser 450 is Jack's Coffee 454. The other potential choices have a lower score. In the case of a tie, the highest listed entry is used. If no entry scores over 50%, the default landmark is used. As can be appreciated, the possible score values do not all add to 100% and certain stores could be provided a bias as a landmark during the design of the table.

Here, as shown in TABLE 2, the print process is 2, a two stage print process that will be bounded by print zone boundaries 460. The customizable section 440 is created initially by the first print process and then an overlay print for landmark 454 is provided as data to the second print process when the addressee information 430 is printed. Here the customization data is provided with the addressee data for application during the addressing/customization step such as by printer 54 that may comprise a dedicated address printer capable of printing such graphic overlays such as by using PCL files.

In an alternative, the addressee data may be used to override a demographic selection. If the addressee data provides a strong likely gender determination (>50%) and the landmark selected using block group demographic data is associated with the opposite sex in the addressee field, the block demographic selection is overridden by replacing the selection with that associated with the correct sex. With reference to TABLE 1, if the potential customer 430 was instead female (>50%) and the demographic test determined Joe's Hardware, the choice would be changed to Town Hairstyle.

In yet another alternative applicable to any of the embodiments herein, certain personal profile data may be available from nearby businesses 90. The direct mail piece production system 30 may create a list of potential customers and then may check that list against customer information from the nearby businesses in a secure manner. The customer information is not exposed to the advertiser 10 or the local business 90. However, if the potential customer in addressee field 430 is a customer of a business noted as a possible landmark in TABLE 1, that business may be used as the customized landmark in an override mode regardless of the demographic, psychographic or addressee field tests. Accordingly, if Jim Smith were a known customer of Joe's Hardware, the system would use that store as the custom landmark instead of Jack's Coffee shop.

It is to be understood that the systems and methods described herein may be applied to other customization tasks including other direct mail piece customization tasks such as customizing the offer associated with the direct mail piece.

Figure 5:
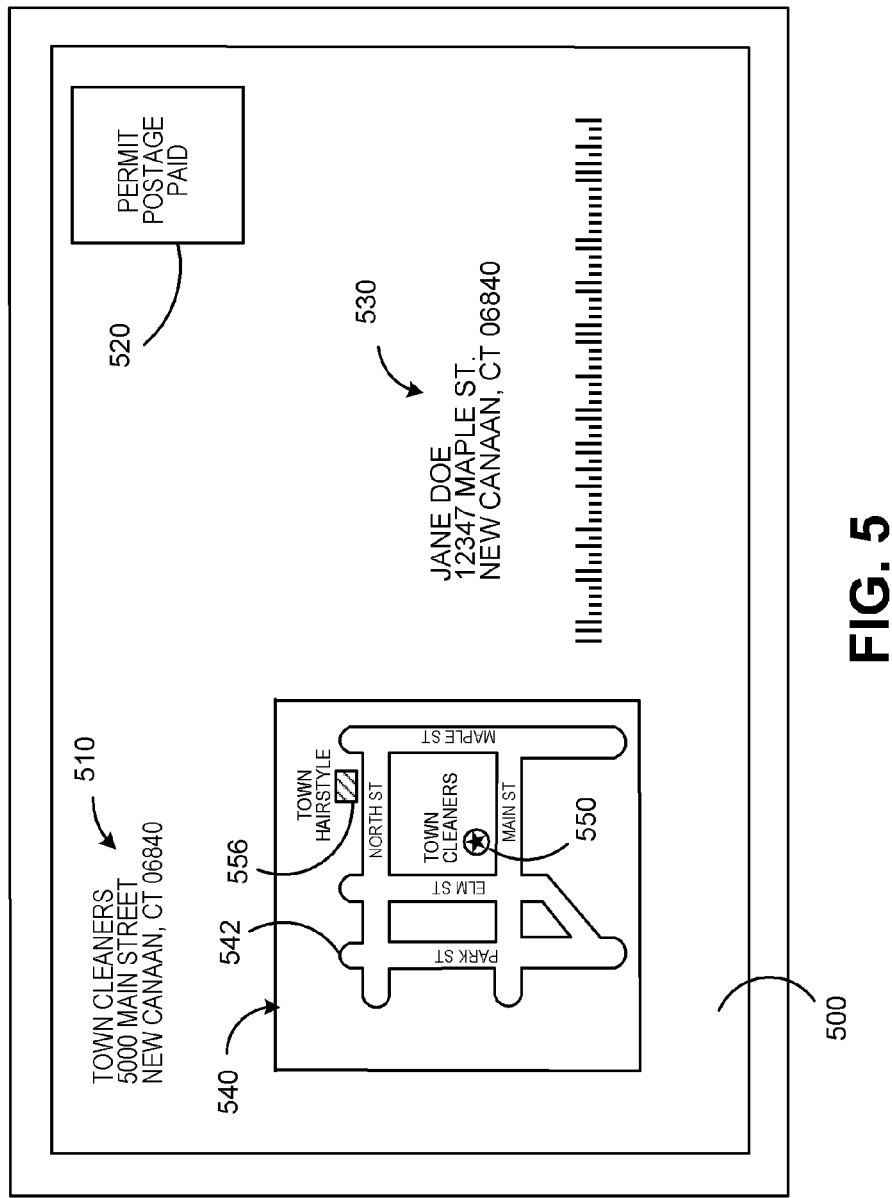
FIG. 5 is a top plan view of a customized direct mail piece using individual profile data according to an embodiment of the present application.

Referring to FIG. 5, a top plan view of a customized direct mail piece 500 using individual profile data according to an embodiment of the present application is shown. The customized postcard 500 according to campaign 0000003 of TABLE 2 includes preprinted sections including the return address field 510, the postal indicium 520 that is a permit postage block and customizable section 540 including map 542 indicating advertiser location 550. An address block 530 is provided including a potential customer name. The customer Jane Doe is targeted as an existing customer and the advertiser has a personal profile for her. The profile may be uploaded to database 37 or stored on computer 12 during processing. Alternatively, personal profile data is provided by profile holders 28.

Using Jane Doe's profile, the system ascertains that she is a frequent customer of Town Hairstyle. Accordingly, the custom landmark 556 is used. Alternatively, personal profile demographic information may be used against the demographic test column. Here, the same customization result would occur. Similarly, the addressee name test would point to the same customization result. If no match is found, the default entry is utilized.

It is to be understood that campaign 000004 can similarly be processed using block group psychographic data or alternatively individual profile psychographic data. For each addressee, a hierarchy of customization tests may be utilized such as personal shopping history first. If there is no personal shopping history, then personal profile demographic tests. If there is no personal profile, then block group demographics unless contradicted by the addressee test as described herein. In yet another alternative applicable to any of the embodiments herein, certain tests may be performed in series if no result is met such that the only default selection would be that used if the final test failed to determine a result such as in campaign 0000005.

Figure 6A:
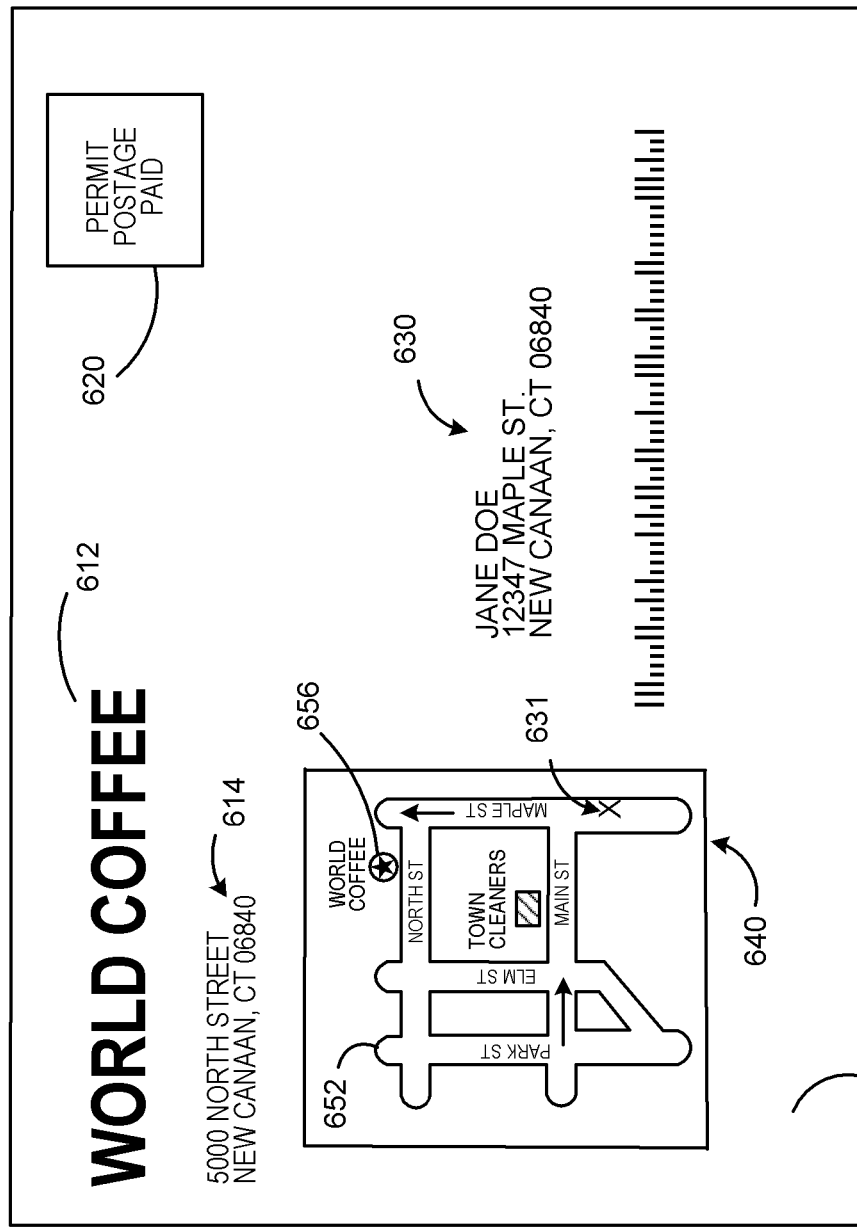
FIG. 6A is a top plan view of a customized direct mail piece created for a multi-location business according to an embodiment of the present application.

Referring to FIG. 6A, a top plan view of a customized direct mail piece created for a multi-location business according to an embodiment of the present application is shown. The customized postcard 600 includes preprinted sections including the return address name field 612, the postal indicium 620 that is a permit postage block and customizable section 640 including map 652 and optionally a static landmark 650. The advertiser location 656 is dynamic content in this postcard 600. Similarly, return address field 614 is dynamic content associated with location 656. An address block 630 is provided including a potential customer name. FIG. 6 is used to illustrate several methods of selecting among multiple nearby advertiser locations when targeting a particular potential customer. Initially, if Jane Doe is targeted as an existing customer of a particular advertiser location 656, the system may select that location.

Next, location intelligence may be utilized with database 36. When mapping location X 631 of the addressee 630, the one way street intelligence suggests that location 656 is the correct location. Accordingly, location 656 is selected. If one advertiser location is in a heavily trafficked area determined using database 36, the advertiser may wish to drive the potential customer to an alternative location. When location 656 is selected the customization overlay includes the 656 location icon and the return address 614. In yet another alternative, individual profile data is used. The profile data may be a customer profile or information received from profile data holders 28 or nearby businesses 90. Additionally, the advertiser may create a demographic or psychographic profile associated with the neighborhood or sub-neighborhood of each location. Then, the block group profile or preferably individual profile of each potential customer is tested against the profile of each location. The best matching location in an acceptable range is then selected.

Figure 6B:
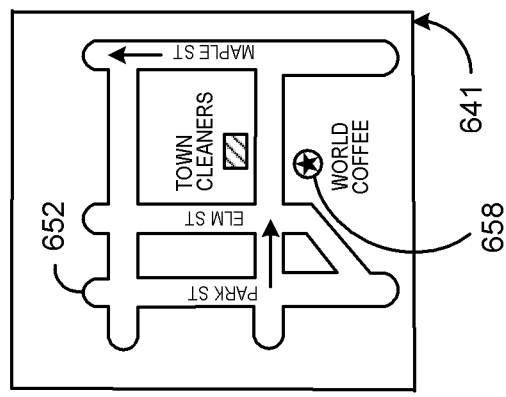
FIG. 6B is a top plan view of an alternative customized portion of the direct mail piece shown in FIG. 6A.

Referring to FIG. 6B, a top plan view of an alternative customized portion of the direct mail piece shown in FIG. 6A is shown. If Jane Doe is a known customer of Town Cleaners 650, her direct mail piece will include map 641 that will be customized for location 658 since that location is closest to her shopping patterns. Similarly, the customization overlay will include return street address field 616 that corresponds to location 658. Where the advertisements are targeted to one of a plurality of advertiser locations, a count of total targeted mailings per location may be provided for use in billing individual franchises.

In another alternative, a bank may utilize individual profile data that determines where a customer usually banks. The customer may then be provided a customized direct mail piece that directs her to a franchise location near her most frequent banking location. Additionally, in the "standby" direct mail piece systems and methods described and referred to herein, the overlay data is applied on an as needed basis according to the mailing list and potential customer zip codes required.

Figure 7A:
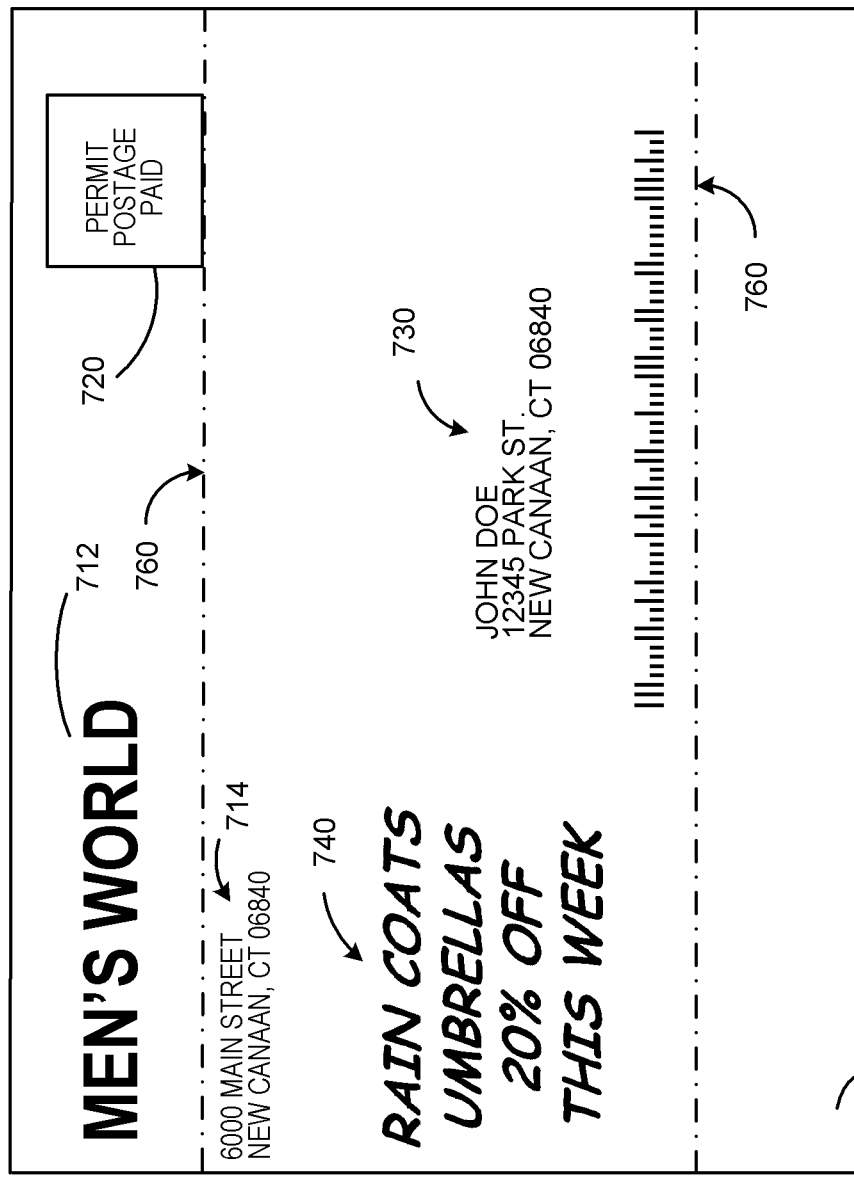
FIG. 7A is a top plan view of a customized direct mail piece created for a multi-location business using environmental data and a secondary print process according to an embodiment of the present application.
Figure 7B:
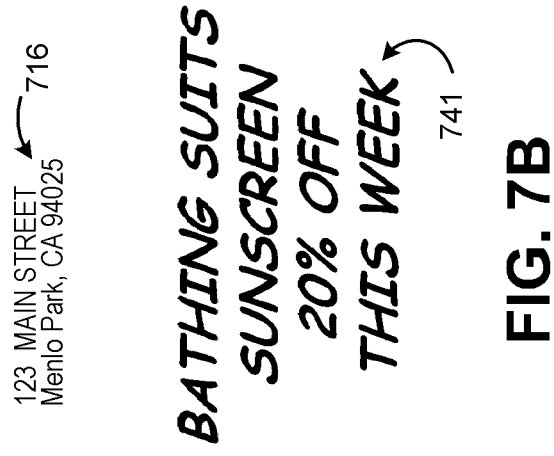
FIG. 7B is a top plan view of an alternative customized portion of the direct mail piece shown in FIG. 7A.

Referring to FIGS. 7A and 7B, a top plan view of a customized direct mail piece 700 created for a multi-location business using environmental data and a secondary print process according to an embodiment of the present application is shown. The customized postcard 700 includes preprinted sections printed in a first print process such as by press 44 including the front of the postcard and the back of the postcard including the return address name field 712 and the postal indicium 720 that is a permit postage block. The advertiser location and address 714 is dynamic content in this postcard 700. An address block 730 is provided including a potential customer name in a particular zip code.

Here, as shown in campaign 0000006 of TABLE 2, the customization is a weather forecast based offer and the print process is 2, a two stage print process that will be bounded by print zone boundaries 760. Here, the postcard 700 will be mailed to zip code 06840 on a known day and will have a reasonably certain time to destination through the USPS delivery system, particularly if inducted in the local postal facility. A five day forecast is retrieved from weather server 22 and used against the tests of TABLE 3.

The customization applied to a particular direct mail design from design database 38 and particular mailing campaign stored in database 33 may be determined using a table stored in customization database 39 shown in Table 3.

TABLE 3

| Customer | Campaign | ZIP | Weather | Test | Customization | Test2? |
|---|---|---|---|---|---|---|
| 000001 | 0000001 | 06840 | Day 2 | default | 10% off | N |
| 000001 | 0000001 | 06840 | Day 2 | Rain | Rain1 | Y |
| 000001 | 0000001 | 94025 | Day 5 | Landmark | 10% off | N |
| 000001 | 0000001 | 94025 | Day 5 | >95 | HOT1 | Y |
| 000001 | 0000002 | any | Day 1-5 | default | 10% off | N |
| 000001 | 0000002 | any | Day 1-5 | Rain | Rain2 | Y |
| ... | ... | ... | ... | ... | ... | |

Here, customer 000001 in campaign 000001 is using design 000001 that is customized. If the direct mail piece is needed in zip code 06840 on a particular day, the five day forecast is retrieved. If there is rain in the forecast for day 2, rain1 offer 740 is printed. If no rain is in the forecast, the default offer of 10% off is used instead. If there are multiple offers that meat the weather criteria, the highest selection is utilized. If the direct mail piece is needed in zip code 94025 on a particular day, the five day forecast is retrieved. If there is >95 degree temperatures in the forecast for day 5, HOT1 offer 741 is printed. If no rain is in the forecast, the default offer of 10% off is used instead.

The environmental test may be further modified using geographic region parameters or other grouping of the locations such as by using a TEST2 flag shown in TABLE 3. Additionally, in the "standby" direct mail piece systems and methods described and referred to herein, the two part print process of FIG. 7A and FIG. 7B may be advantageously used to provide on demand customization at a presort house 60 in order to provide standby mail pieces for multiple zip codes. Additionally, the direct mail piece system 30 may be used to customize each of the standby mail pieces using environmental data such as a 5 day weather forecast. In campaign 000002, the same test is applied to any destination zip code and if rain is forecast on any of days 1-5 from expected induction, the rain2 offer would be utilized.

Figures 8, 9:
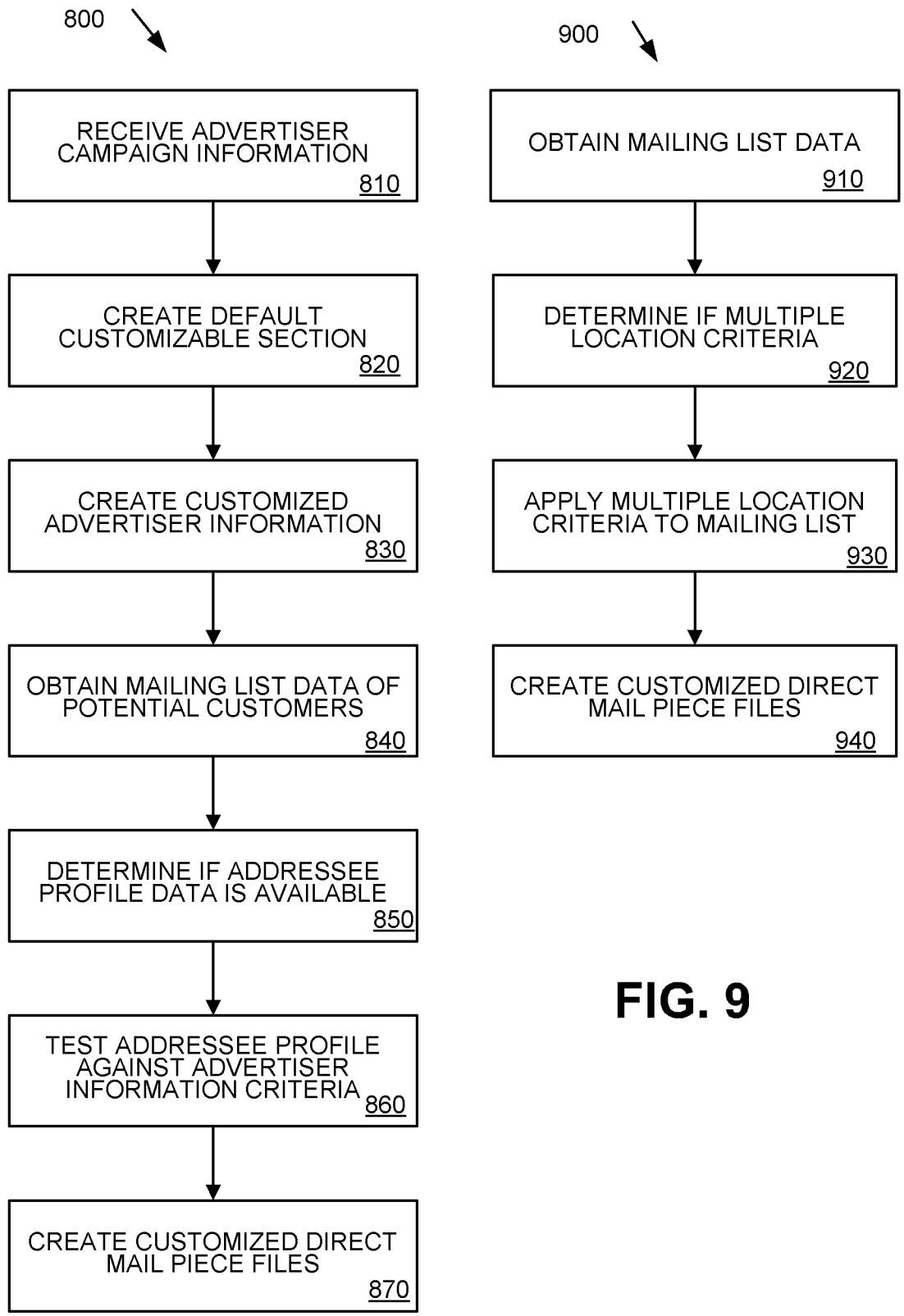
FIG. 8 is a flowchart showing an illustrative process for customizing advertiser location related information on a direct mail piece according to an illustrative embodiment of the present application.
FIG. 9 is a flowchart showing an illustrative process for customizing a direct mail piece for an advertiser having multiple locations according to an illustrative embodiment of the present application.

Referring to FIG. 8, a flowchart 800 showing an illustrative process for customizing advertiser location related information on a direct mail piece according to an illustrative embodiment of the present application is shown. In step 810, the process receives advertiser campaign information. In step 820, the system creates a default customizable section such as a default map having an advertiser location icon. In step 830, the system prompts the advertiser user to create custom information regarding the advertiser such as custom landmark data that includes a default and several targeted landmarks. The system also prompts the user to create a targeted profile for each landmark. The system alternatively provides the landmark profile data. In step 840, the system obtains a mailing list data including a list of the potential customers (addressees). In step 850, the system determines if addressee related profile data is available. In step 860, the system tests the addressee profile data against the campaign customized advertiser information (e.g., landmark criteria) to determine a best match. In step 870, the system creates the customized direct mail piece files. The system then prints, finishes and inducts the direct mail pieces. The process is to be understood with reference to and as including the system and mail piece figures and descriptions above.

Here, an illustrative method for customizing a plurality of direct mail pieces associated with a direct mail campaign for an advertiser includes obtaining a direct mail campaign profile comprising at least one advertiser related customization associated with at least one potential customer profile criteria for the direct mail campaign; obtaining a list of potential customers, wherein at least two potential customers are associated with profile data and with a respective one of the plurality of mail pieces; obtaining profile data for each of the at least two potential customers; determining whether the at lease one advertiser related customization is applicable for each of the plurality of direct mail pieces using the profile data obtained for each of the at least two potential customers; and creating a customized direct mail piece file for the plurality of direct mail pieces using the determination of whether the at least one advertiser related customization is applicable and applying the customization for each of the plurality of direct mail pieces if applicable.

Since the direct mail pieces may be completely printed on demand or customized on demand from preprinted stock, the system can take into account multi-location data on a real-time as needed basis and inducted with the delivery service such as the United States Postal Service when needed. The system may also use preprinted stock and then print customizable portion including a customization overlay using a second printer with a customizable portion includes an advertiser address section, a potential customer address section and the customization overlay is printed over the customizable printed section using the second printer comprising an address printer.

Moreover, the advertiser information may include at least one customized landmark for a customizable map associated with at least one advertiser location, and the at least one potential customer profile criteria is selected from the group consisting of aggregated block group targeting data, individual profile data and addressee data as more fully described above. For example, the profile data for each of the at least two potential customers comprises profile data selected from the group consisting of aggregated block group targeting data, individual profile data and addressee data.

The profile data for each of the at least two potential customers may include individual profile data obtained from a third party by a trusted third party and wherein the individual profile data is not provided to the advertiser. For example, individual shopping history profile data may be used. The at least one customized landmark may include a nearby business located relatively nearby the advertiser and it is selected as a custom landmark if the at least one potential customer is a customer of the nearby business.

Referring to FIG. 9, a flowchart showing an illustrative process 900 for customizing a direct mail piece for an advertiser having multiple locations according to an illustrative embodiment of the present application is shown. In step 910, the system obtains a mailing list data including a list of the potential customers (addressees). In step 920, the system determines if the campaign includes multiple location selection criteria. In step 930, the system applies the multiple location criteria to the mailing list and in step 940 creates the customized direct mail piece files. The system then prints, finishes and inducts the direct mail pieces. The process is to be understood with reference to and as including the system and mail piece figures and descriptions above.

Here, an illustrative method for customizing a plurality of direct mail pieces associated with a direct mail campaign for an advertiser having at least two locations may be especially useful for franchises or other multi-location businesses. The process may include obtaining a direct mail campaign profile including at least one advertiser related location customization associated with at least one potential customer profile criteria for the direct mail campaign and the at least two locations; obtaining a list of potential customers, wherein at least two potential customers are associated with profile data and with a respective one of the plurality of mail pieces; obtaining profile data for each of the at least two potential customers; determining whether the at lease one advertiser related location customization is applicable for each of the plurality of direct mail pieces using the profile data obtained for each of the at least two potential customers; and creating a customized direct mail piece file for the plurality of direct mail pieces using the determination of whether the at least one advertiser related location customization is applicable and applying the customization for each of the plurality of direct mail pieces if applicable. The system may be used to drive traffic to a particular location or choose the likely most convenient location for a particular potential customer such as based on the particular customer's purchase history.

Since the direct mail pieces may be completely printed on demand or customized on demand from preprinted stock, the system can take into account multi-location data on a real-time as needed basis and inducted with the delivery service such as the United States Postal Service when needed. The system may also use preprinted stock and then print customizable portion including a customization overlay using a second printer with a customizable portion includes an advertiser address section, a potential customer address section and the customization overlay is printed over the customizable printed section using the second printer comprising an address printer. Moreover, the advertiser information may include a customizable map associated with the at least two advertiser locations, and only one of the at least two locations is selected and printed on the customizable map using at least one potential customer profile criteria selected from the group consisting of aggregated block group targeting data, individual profile data and addressee data. The particular location may be selected if the potential customer is a customer of a nearby business. In an alternative that may be particularly useful for charge back purposes in independently owned franchise uses, the system may maintain a location count of each of the customized direct mail pieces associated with each of the at least two locations; and provide the location counts to the advertiser.

Referring to FIG. 10, a flowchart showing an illustrative process 1000 for customizing a direct mail piece using environmental data according to an illustrative embodiment of the present application is shown. In step 1010, the system obtains a mailing list data including a list of the potential customers (addressees). In step 1020, the system determines if the campaign includes environmental selection criteria such as weather forecast customization criteria. In step 1030, the system applies the weather forecast criteria to the mailing list and in step 1040 creates the customized direct mail piece files. The system then prints, finishes and inducts the direct mail pieces. The process is to be understood with reference to and as including the system and mail piece figures and descriptions above.

Here, an illustrative method for customizing a plurality of mail pieces associated with a mail campaign includes obtaining a mail campaign profile comprising at least one environmental data related customization associated with at least one environmental parameter for the mail campaign; obtaining an environmental data forecast; determining whether the at lease one environmental data related customization is applicable for each of the plurality of mail pieces using the campaign profile and the environmental data forecast; and creating a customized mail piece file for the plurality of mail pieces using the determination of whether the at least one environmental data related customization is applicable and applying the customization for each of the plurality of mail pieces if applicable. As can be appreciated from the descriptions herein, the environmental data may include weather data and the environmental data forecast may include a weather forecast. Similarly, the mail piece may be a direct mail piece and the at least one environmental parameter may be a weather forecast dependent offer—such as a sale on umbrellas if rain is in the local forecast. Since the direct mail pieces may be completely printed on demand or customized on demand from preprinted stock, the system can take into account environmental data on a real-time as needed basis and inducted with the delivery service such as the United States Postal Service when needed. Moreover, the mail campaign may include sub-mailings each associated with a distinct destination zip code. The associated environmental forecast (weather) includes a sub-forecast obtained for each distinct destination zip code and the system separately applies the weather criteria to each zip code in the mailing.

Referring to FIG. 11, a flowchart showing an illustrative process 1100 for customizing a direct mail piece using a first print process and a second print process according to an illustrative embodiment of the present application is shown. In step 1110, the system receives pre-printed customizable mail pieces printed with a first printer. In step 1120, the system obtains a mailing list data including a list of the potential customers (addressees) and a customization overlay for at least one of the addressees. In step 1130, the system creates the customized direct mail pieces by printing the addressee data and customized overlay together in a second print process using a second printer. In an alternative, a dedicated address printer is utilized for the second print process. The process is to be understood with reference to and as including the system and mail piece figures and descriptions above.

The mail piece creation systems described may be obtained from Pitney Bowes Inc. of Stamford, Conn. and include the PITNEY BOWES APS inserter system, OLYMPUS II sorter, MAPINFO PROFESSIONAL, TARGETPRO, EXPONARE, ENVINSA, MAPMARKER, MAPEXTREME and PSYTE. The commercial printer 44 may include a HEIDELBERG SPEEDMASTER press and the dedicated address printer 54 may include the DA95F ADDRESSRIGHT Addressing System available from Pitney Bowes Inc. of Stamford, Conn. Alternative printing systems may be used. Geocoding may be provided by the customizable DOC1 suite and the GEOSTAN system available from Group 1 Software, a Pitney Bowes Company, of Lanham, Md. The advertiser systems 12 may include WINDOWS/INTEL architecture systems running WINDOWS and INTERNET EXPLORER BROWSER such as the DELL DIMENSION E520 available from Dell Computer Corporation of Round Rock, Tex. While the electronic communications networks have been described as Internet connections, other communications channels such as Local and Wide Area Networks, telephony and wireless communications channels may be used. Furthermore, while the USPS physical delivery system has been described, other physical delivery systems such as courier systems may be used. The advertiser 12 client is a thin client based on the INTERNET EXPLORER browser, but other clients such as heavy clients may be used. In illustrative embodiments, the advertiser is authenticated at server 32 using a username/password, but other authentication systems may be used.

The embodiments described herein utilize postcards as illustrative mail pieces. However, the systems and methods herein may be utilized with catalogs, enveloped advertisements and other forms of direct mail pieces. Moreover, U.S. Census Bureau block group demographic data is referred to herein in several embodiments, but other sources of demographic and psychographic data at varying levels of aggregation including individual data are available in the marketplace and may also be utilized by the systems described. Similarly, the physical configuration of the system may be varied such that certain functions are clustered within a single operating entity. Certain electronic communications channels described herein utilize the Internet, but some or all of the electronic communications channels may be private networks, telephony networks or other data communications channels and all may utilize data security systems such as encryption. The systems described herein utilize web services components that generally provide Internet access to the data through provided API calls. For example any of the many different systems encompassed by the W3C Web service definition may be used, including but not limited to clients and servers that communicate using XML messages that follow the SOAP standard.

In alternative embodiments, the embodiments described herein may additionally and/or alternatively utilize the systems and methods for combining mail pieces that were going to be mailed on different dates described in commonly-owned, co-pending U.S. patent application Ser. No. 12/028,386, entitled "Method For Combining Mail Pieces That Were Going To Be Mailed On Different Dates To Increase Postal Discounts," filed Feb. 8, 2008, by Winkelman, et al., which is incorporated herein by reference in its entirety. For example, in an alternative applicable to any of the embodiments herein, the systems and methods therein may be used to combine multiple direct mail campaigns such that postal discounts are optimized if delivery dates relevant to the mailing campaigns permit such combination.

The direct mail pieces described herein may be delivered in accordance with the systems and methods described in commonly-owned, co-pending U.S. patent application Ser. No. 12/195,417, entitled "Systems And Methods For Optimizing Postage Costs In A Direct Marketing Campaign", filed on even date herewith by Rojas, et al., the application incorporated by reference herein in its entirety. For example, with reference to FIG. 1, if standby mail pieces are desired, a pre-printed batch of postcards may be provided to the direct mail company including systems 30, 40, 50 and 60. Alternatively, this embodiment may be executed by a presort house 60. A 5-digit presort bin requires a minimum of 150 pieces, but they do not have to be in delivery sort order. When needed to fill a 5-digit sort bin, the required number of standby postcards or advertising letters are addressed and customized such as by using weather data and printer 66 with information from server 32. A standby direct mail list may be exhausted over time as space opens up in each 5-digit bin by maintaining records of the addresses used to date. The customization may change for each batch for example if the weather forecast changes. Alternatively, printer 66 may print the entire direct mail piece on demand when needed to fill a sort bin.

For example, a direct mail advertiser may buy access to a mailing list including 100 names in a particular zip code such as 08460, without even knowing the identity of the potential customers. The advertiser wishes to reduce postage costs and instructs the direct mail company to hold the mail pieces on standby for up to four weeks using a defined weather forecast based customization. In the first week of the month, a 06840 bin with only 140 pieces is available. Direct mail company server 32 randomly selects 10 names from the 100 name list and marks them as used. Server 32 then applies the weather forecast customizations for the first week and communicates with printer 66 to customize the 10 mail pieces such as according to the description above with reference to FIG. 7A. While the advertiser could normally add all of its mail pieces to the first bin at the discounted price, the direct mail company wishes to have additional mail pieces in standby mode in order to fill more bins to the minimum 5-digit sort capacity of 150 pieces. Accordingly, the direct mail company provides appropriate financial incentive for using the standby mode. During the next week, 10 more pieces are used each business day with a second weather customization applied based upon the second week weather forecast. In the third week, no standby pieces are required. On the last business day of the fourth week, no standby mail pieces are required, but the standby period is exhausted. Because the standby period is exhausted, the remaining 40 direct mail pieces are customized using the weather forecast for week 4 and inducted on the last business day of week 4.

In another alternative applicable to any of the relevant embodiments described herein, the individual data may be provided in a secure manner using data from the nearby businesses. If the targeted recipient of the direct mail piece is a customer of one of the nearby businesses, that business may be selected as the customized map landmark. Additionally, the individual data may be secured using a trusted third party intermediary. In such a case, the Direct Mail Campaign Design system identifies a default and several other potential landmarks and the trusted third party then selects the appropriate landmark based upon individual data. The modified address record with customized landmark data is then send to the Direct Mail Addressing/Customizing vendor for a single use and not forwarded to the Direct Mail Campaign Design system.

In another alternative applicable to any of the relevant embodiments described herein, the customizable advertiser related information such as relevant landmark may be determined using sales traffic analysis. For example, the advertiser identifies 5 potential landmark businesses to add to its customizable location map. Alternatively, the system 32 suggests a list of potential landmarks. Instead of utilizing addressee demographics or similar information, a credit card company 28 provides aggregate sales traffic volume for each of the potential landmarks. The potential landmark with the highest sales traffic is selected.

In yet another alternative applicable to any of the relevant embodiments described herein, the individual data may be provided by a credit card company or other aggregator of information such as that related to individual sales history. The Direct Mail Campaign Design system 32 may send a list of several potential nearby business landmarks 90 for use on a map in a direct mail piece to a credit card company. The credit card company may then respond with a list of selected businesses such as those frequented by the targeted direct mail recipient 80. Since the advertiser is not provided with the customization overlay associated with each direct mail piece, the system provides a level of privacy. Alternatively, the credit card company may operate the entire service 30, 40, 50, 60 so as to maintain the integrity and security of the data used.

While several embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A computer implemented method for customizing a plurality of direct mail pieces associated with a direct mail campaign for an advertiser comprising:
   receiving, by a computer, a direct mail campaign profile comprising at least one customized landmark associated with at least one customer profile criteria for the direct mail campaign;
   receiving, by the computer, a list of potential customers;
   receiving, by the computer, profile data for one or more of the potential customers;
   comparing, by the computer, the profile data for the one or more of the potential customers to the at least one customer profile criteria;
   determining, by the computer, which of the at least one customer profile criteria matches the profile data for the one or more of the potential customers;
   selecting, by the computer, the customized landmark that is associated with the at least one customer profile criteria that matches the profile data for the one or more of the potential customers; and
   creating a customized direct mail piece file for the plurality of direct mail pieces that includes a map having an advertiser location icon and the customized landmark that is selected for each of the one or more of the potential customers.

2. The method of claim 1 further comprising:
   printing the plurality of direct mail pieces using the customized direct mail piece file; and
   inducting the plurality of direct mail pieces with a delivery service.

3. The method of claim 1 further comprising:
   printing a first printed portion on each of the plurality of direct mail pieces using a first printer; and
   printing a customizable portion including a customization overlay using a second printer.

4. The method of claim 3 wherein the first printed portion includes a customizable printed section that is printed using the first printer; and the customizable portion includes an address section and the customization overlay is printed over the customizable printed section using the second printer comprising an address printer.

5. The method of claim 1, wherein the at least one customer profile criteria is selected from the group consisting of aggregated block group targeting data, individual profile data and addressee data.

6. The method of claim 1, wherein the profile data for the one or more potential customers comprises profile data selected from the group consisting of aggregated block group targeting data, individual profile data and addressee data.

7. The method of claim 1, wherein the profile data for the one or more potential customers comprises individual profile data obtained from a third party by a trusted third party and wherein the individual profile data is not provided to the advertiser.

8. The method of claim 1, further comprising:
   determining that at least one of the one or more potential customers is a customer of a nearby business, wherein the customized landmark includes the nearby business located relatively nearby the advertiser and it is selected as a custom landmark after it is determined that the at least one potential customer is a customer of the nearby business.

9. The method of claim 1, wherein the creating a customized direct mail piece file further comprises utilizing environmental data.

10. The method of claim 9, wherein the environmental data comprises weather forecast data.

11. The method of claim 1, wherein the advertiser has at least two locations, and an advertiser location icon for only one of the at least two locations is included in the customized direct mail piece file based on addressee data and location intelligence data.

* * * * *